July 11, 1939.    O. T. WOOD    2,165,602
FLASHLIGHT
Original Filed Dec. 21, 1937
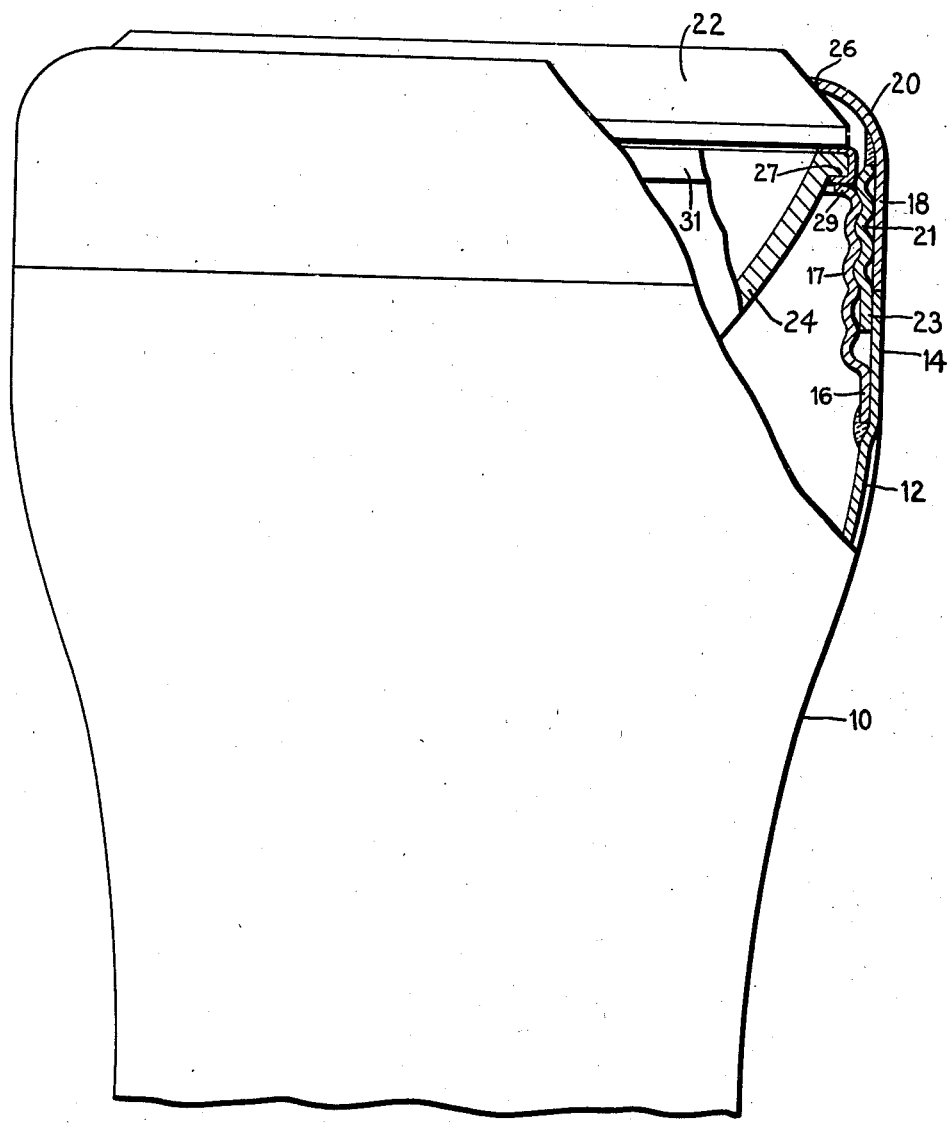
INVENTOR
ORVILLE T. WOOD
BY
Arton and Griswold
ATTORNEYS Patented July 11, 1939

2,165,602

UNITED STATES PATENT OFFICE 2,165,602

FLASHLIGHT

Orville T. Wood, Clinton, Mass., assignor to Blake Manufacturing Corporation, Clinton, Mass., a corporation of Massachusetts Original application December 21, 1937, Serial No. 180,949. Divided and this application February 21, 1938, Serial No. 191,664

6 Claims. (Cl. 240—10.6)

This invention relates to flashlights and electric hand lanterns of the kind in which an incandescent lamp is illuminated by one or more dry cells in a circuit therewith controlled by a manually actuated circuit closer. More particularly the invention relates to flashlights and lanterns in which the threads by which the parts are united are concealed from view. This application is a division of copending application Serial Number 180,949 filed December 21, 1937. One object of the invention is a casing, as for a flashlight, in which not only are the threads concealed from view, but a smooth continuous surface is afforded and the joint between the respective casing portions is scarcely visible. Accordingly, the respective casing portions proximate the joint therebetween are of the same outside diameter, the meshing threaded members being carried inwardly of the casing portions, respectively, and one of said threaded members entering between the other threaded member and the casing portion to which the latter is fixed.

Another object of the invention is to facilitate the intermeshing of the threads on the respective separable casing portions in the act of joining the portions together. To this end, the free ends of the threaded members extend beyond the edges of the casing portions with which they are respectively carried. Also, conveniently, the free end of the innermost threaded member is turned away from the cylindrical plane of the casing portion on which it is carried to guide and facilitate the entry of the coacting threaded member.

It is also an object of the invention to provide a joint between casing portions which is reenforced, in effect, to oppose relative lateral displacement of one casing portion with respect to the other and insure a continuous and smooth surface contour at all times. In part this is effected by the overlapping of the threaded members at the joint. Also in carrying this aspect of the invention into effect, the free end of the intermediate threaded member is of substantially cylindrical form and extends beyond the edge of the casing portion and is of an outside diameter substantially equal to the inside diameter of the companion casing portion so that when the two casing portions are assembled the cylindrical portion of the inner threaded member will engage the inner surface of at least the companion casing portion, and preferably of both casing portions, thereby holding the casing parts in substantial alignment.

The invention also seeks a flashlight or hand lantern construction which is practical from the standpoint of ease and cheapness of manufacture and practicability and durability in use.

These and other objects of the invention and the means for their attainment will be more apparent from the following detailed description taken in connection with the accompanying drawing, illustrating one embodiment by which the invention may be realized and in which:

The figure is a view in side elevation and partly in longitudinal section showing the upper end of a flashlight embodying the invention, parts being broken away to show details of construction.

While the invention has been shown as applied to the hood of a flashlight, it will be obvious, as the description proceeds, that it is applicable in any situation where an end member, such as a bottom cap, is to be removably secured to a casing or body member, as of a flashlight.

In the illustrated embodiment, the end of a tubular flashlight casing 10 is shown as of progressively increasing diameter, as at 12, and at its extremity is outwardly offset as a cylindrically shaped open end portion 14. Such shape, however, is not material to the invention in all its aspects. Secured inwardly of the end portion 14 is a shell member 16 formed with threads 17 and which threaded shell member is shown as extending beyond the rim of the end portion 14 and in spaced relation thereto inwardly thereof.

Of the same shape and diameter as the end portion 14 is a lens ring 18 formed with an inwardly directed bezel portion or curved flange 20 adapted to overlie and retain a lens 22 on the reflector 24. To the inner surface of the lens ring 18 there is secured a threaded shell member 21 adapted to fit inside the end portion 14 and to have threaded engagement with the threaded member 17. Each of the threaded shell members 17 and 21 project beyond the casing portions 14 and 18 to which they are respectively attached. The free edge 23 of the threaded portion 21 is of plane cylindrical form and is closely positioned with respect to the inner surface of the bezel ring but conveniently projects therebeyond to lie within the portion 14 when the parts are in place. The outer diameter of the cylindrical end 23 is preferably substantially equal to the inner diameter of the casing portion 14. Thereby is the edge of the bezel guided and both the parts 18 and 14 are held in smooth abutting relation against relative lateral displacement.

The outer edge 27 of the reflector 24 is outwardly directed, as a peripheral flange, adapted to rest on an inturned edge 29 formed on the rim of the threaded shell 17 of the casing. In the illustrated embodiment, the reflector, being of metal, is conductive and is insulated from the casing, which conveniently forms part of the electrical circuit, by a channel shaped member 31 of insulating material which embraces the flange 27 and insulates the conductive reflector 24 from the conductive casing part. The inwardly turned end 29 also serves as a guide or centering means for the end edge, such as at 23, of the threaded shell 21 whereby entry of the threaded member on the one casing portion into the space between the companion threaded shell on the other casing portion is facilitated. So much of the structure as has been described is shown, described and claimed in copending application Serial No. 180,949 filed December 21, 1937, from which the said subject matter has been divided.

Conveniently, but not necessarily, the periphery of the lens 22 is bevelled, as at 26, so that, as the lens ring 18 is screwed onto the casing end, the edge of the lens ring flange 20 will find a seat on the lens surface and firmly hold the lens in place. The edge of bezel 18, 20 will, when in place, abut the end of the offset portion 14 to give a smooth and unbroken contour, hiding the threads and with the joint scarcely visible.

While the invention has been illustrated as applied to the upper end of a flashlight it will be apparent that the joint disclosed is equally applicable as a connection between any two disconnectable portions of a flashlight, or other instrumentality such as that between a hood and the casing or between the casing and a bottom cap.

Various modifications will occur to those skilled in the art in the composition, configuration and disposition of the component element going to make up the invention as a whole as well as in the adoption and/or combination of selected elements for specific purposes and no limitation is intended by the phraseology of the foregoing description or illustrations in the accompanying drawing, except as indicated in the appended claims.

What is claimed is:

1. In a flashlight, in combination, a casing portion having a rim, an end portion having a rim adapted to abut the rim of the casing portion, a threaded member carried inwardly of the casing portion and extending outwardly beyond the rim thereof, a threaded member carried inwardly of the end member and extending outwardly beyond the rim thereof for threaded engagement with the first named member whereby said respective rims are retained in abutting relation and the outer surfaces of the casing portion and end portion are continuous.

2. In a flashlight, in combination, a casing portion having a rim, an end portion having a rim adapted to abut the rim of the casing portion, a threaded member carried inwardly of the casing portion and extending outwardly beyond the rim thereof, a threaded member carried inwardly of the end member and extending outwardly beyond the rim thereof for threaded engagement with the first named member, one of said threaded members being disposed between the other threaded member and the portion on which it is carried whereby said respective rim are retained in abutting relation and the outer surfaces of the casing portion and end portion are continuous.

3. In a flashlight, in combination, a casing portion having a rim, an end portion having a rim adapted to abut the rim of the casing portion, a threaded member carried inwardly of one said portion and extending outwardly beyond the rim thereof, threaded member carried inwardly of the other said portion and extending outwardly beyond the rim thereof for threaded engagement with the first named threaded member, one of said threaded members being disposed between the other threaded member and the portion on which it is carried whereby said respective rims are retained in abutting relation and the outer surfaces of the casing portion and end portion are substantially continuous.

4. In a flashlight, in combination, a casing portion having a rim, an end portion having a rim adapted to abut the rim of the casing portion, a threaded member carried inwardly of the casing portion and extending outwardly beyond the rim thereof, a threaded member carried inwardly of the end member and extending outwardly beyond the rim thereof for threaded engagement with the first named member, one of said threaded members being formed with a straight end to engage the inner surface of the portion on which the other threaded member is carried whereby said respective rims are retained in abutting relation and the outer surfaces of the casing portion and end portion are continuous.

5. In a flashlight, in combination, a casing portion having a rim, an end portion having a rim adapted to abut the rim of the casing portion, a threaded member carried inwardly of the casing portion and extending outwardly beyond the rim thereof, a threaded member carried inwardly of the end member and extending outwardly beyond the rim thereof for threaded engagement with the first named member whereby said respective rims are retained in abutting relation and the outer surfaces of the casing portion and end portion are continuous, the free edge of the threaded member carried with the casing portion being deflected away from the cylindrical plane of the casing portion.

6. In a flashlight, in combination, a casing portion having a rim, an end portion having a rim adapted to abut the rim of the casing portion, a threaded member carried inwardly of the casing portion and extending outwardly beyond the rim thereof, a threaded member carried inwardly of the end member and extending outwardly beyond the rim thereof for threaded engagement with the first named member whereby said respective rims are retained in abutting relation and the outer surfaces of the casing portion and end portion are continuous, the threaded member carried with the casing portion being deflected and a reflector supported on the deflected end.

ORVILLE T. WOOD.